US010537952B2

(12) United States Patent
Landi (10) Patent No.: US 10,537,952 B2
(45) Date of Patent: Jan. 21, 2020

(54) MACHINE AND METHOD FOR THE FINISHING OF GEARS (71) Applicant: SAMP S.p.A. CON UNICO SOCIO, Bentivoglio (IT)

(72) Inventor: Enrico Landi, Bentivoglio (IT)

(73) Assignee: SAMP S.P.A. CON UNICO SOCIO, Bentivoglio (IT)

(*) Notice: Subject to any disclaimer, the term of this patent is extended or adjusted under 35 U.S.C. 154(b) by 250 days.

(21) Appl. No.: 14/894,039

(22) PCT Filed: May 27, 2014

(86) PCT No.: PCT/IB2014/061760
§ 371 (c)(1),
(2) Date: Nov. 25, 2015

(87) PCT Pub. No.: WO2014/191923
PCT Pub. Date: Dec. 4, 2014

(65) Prior Publication Data
US 2016/0129510 A1    May 12, 2016

(30) Foreign Application Priority Data

May 27, 2013   (IT) .............................. BO2013A0263

(51) Int. Cl.
B23F 23/00       (2006.01)
B23F 23/04       (2006.01)
B23F 19/12       (2006.01)

(52) U.S. Cl.
CPC ............ *B23F 23/006* (2013.01); *B23F 19/12* (2013.01); *B23F 23/04* (2013.01)

(58) Field of Classification Search
CPC ... B23F 9/10; B23F 9/12; B23F 23/04; B23Q 39/00; B23Q 39/028; B23Q 39/04; B23Q 39/046; B24B 49/10; B24B 49/12
(Continued)

(56) References Cited

U.S. PATENT DOCUMENTS 6,565,418 B1 *   5/2003  Feisel ..................... B23F 23/04
                                                              451/10
9,937,574 B2 *   4/2018  Krebser ................. B23F 23/04
(Continued)

FOREIGN PATENT DOCUMENTS

CN    102114558         7/2012
CN    102114558 B  *    7/2012  .............. B23F 23/00
(Continued)

OTHER PUBLICATIONS

JPO Office Action, Appln. No. 2016-516286, Ref. No. PA-27142, Dispatch No. 213900, dated May 29, 2018 (attached hereto, with translation).

*Primary Examiner* — Monica S Carter
*Assistant Examiner* — Makena S Markman
(74) *Attorney, Agent, or Firm* — Matthew A. Pequignot; Pequignot + Myers (57) ABSTRACT A machine and method for the finishing of gears with a finishing tool, in particular a grinding wheel; the machine having a plurality of workpiece carrier slides, a plurality of workpiece carrier spindles, each of which is mounted on a respective workpiece carrier slide, and a plurality of loading-unloading stations; each workpiece carrier spindle is rotating and supports a gear; each workpiece carrier slide slides from a respective loading-unloading station to a working station and vice versa; in which the control unit synchronizes the rotation of each gear with the rotation of the finishing tool outside of the working station so that by entering the working station the gear meshes with the finishing tool without collisions.

14 Claims, 5 Drawing Sheets (58) Field of Classification Search
USPC ............ 451/47, 5, 8–10, 249, 253, 331, 244
See application file for complete search history.

(56) References Cited

U.S. PATENT DOCUMENTS

2004/0161314 A1    8/2004  Gnadt
2013/0045667 A1*   2/2013  Katsuma ................... B23F 5/04
                                                    451/253

FOREIGN PATENT DOCUMENTS

| DE | 29815125 | | 11/1998 | |
|---|---|---|---|---|
| DE | 29815125 | U1 * | 11/1998 | .............. B23F 23/04 |
| DE | 19857592 | | 6/2000 | |
| DE | 202009013263 | U1 | 4/2010 | |
| WO | WO 2011/010209 | | 1/2011 | |
| WO | WO 2011010209 | A1 * | 1/2011 | .............. B23F 1/065 |

* cited by examiner

MACHINE AND METHOD FOR THE FINISHING OF GEARS

RELATED APPLICATION DATA

This application is the national stage entry of International Patent Application No. PCT/IB2014/061760, filed on May 27, 2014, which claims priority to Italy Patent Application No. BO2013A000263, filed on May 27, 2013. All claims of priority to these applications are hereby made, and each of these applications is hereby incorporated in its entirety by reference.

TECHNICAL FIELD

The present patent application relates to a machine and a method for the finishing of gears.

In particular, the present patent application relates to a machine and a method for the finishing of gears having reduced dimensions; for example, for the finishing of gears with a head diameter smaller than 80-100 mm.

BACKGROUND ART

A typical finishing operation is grinding and it is known to grind gears by means of vertical axis grinding machines, in which the grinding times are relatively short in the order of tenths of seconds and, therefore, the interlocking times of the finishing machine particularly effect production times and costs.

To reduce the interlocking times, it is known from DE19857592-A1 that a grinding machine of the type described above has a working station and a loading-unloading station and comprises a rotating supply table on which two workpiece carrier spindles are mounted. The supply table cyclically transports the workpiece carrier spindles from the loading-unloading station to the working station, and vice versa. Thereby, while one gear mounted on a workpiece carrier spindle is processed at the working station, the other workpiece carrier spindle is arranged at the loading-unloading station to unload any ground gears and to load a gear to be ground.

Furthermore, in a grinding machine of the type described above, it is known to rotate and synchronize the gear to be ground with the grinding wheel outside of the working station or during the transport from the loading-unloading station to the working station. Therefore, the times for interlocking the gear to the working station are significantly reduced.

The grinding machine described above has the drawback of having to move the grinding wheel away from the table between one gear change and the other due to reasons of the volume of the table. Thus, in an interlocking system of this type, the interlocking times of the working station again significantly effect the overall grinding times, despite the synchronization of the gear with the grinding wheel.

DISCLOSURE OF INVENTION

It is the object of the present invention to provide a machine and a method for the finishing of gears which allow the interlocking times of the working station, and subsequently the production times, to be reduced.

According to the present invention, a machine and a method are provided according to what is claimed in the appended claims.

BRIEF DESCRIPTION OF THE DRAWINGS

The invention will now be described with reference to the accompanying drawings, which illustrate non-limiting embodiments thereof, in which.

BEST MODE FOR CARRYING OUT THE INVENTION

Figure 1:
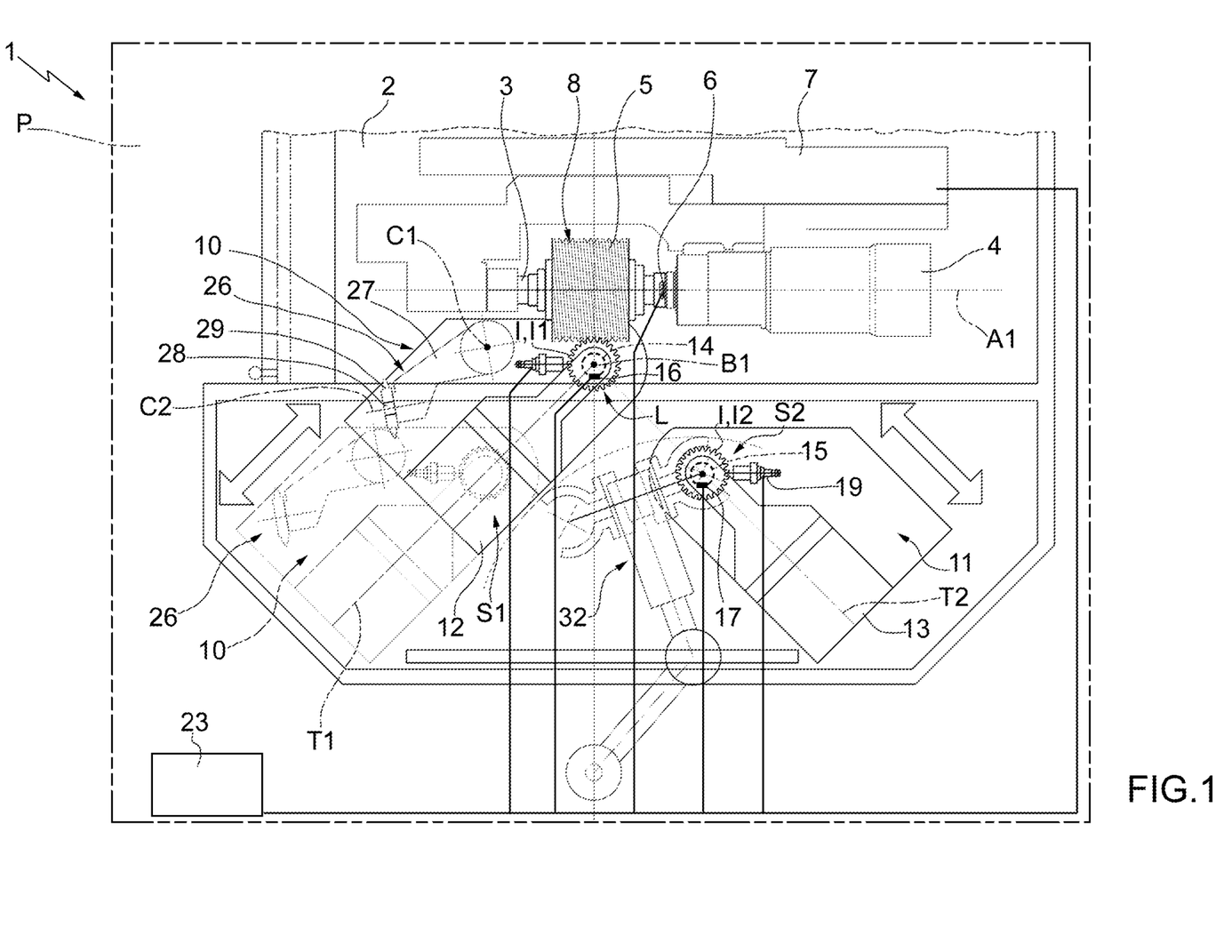
FIGS. 1 and 2 show a diagram, in plan view and with parts removed for clarity, of a finishing machine according to the present invention in a first and in a second operating configuration, respectively.
Figure 2:
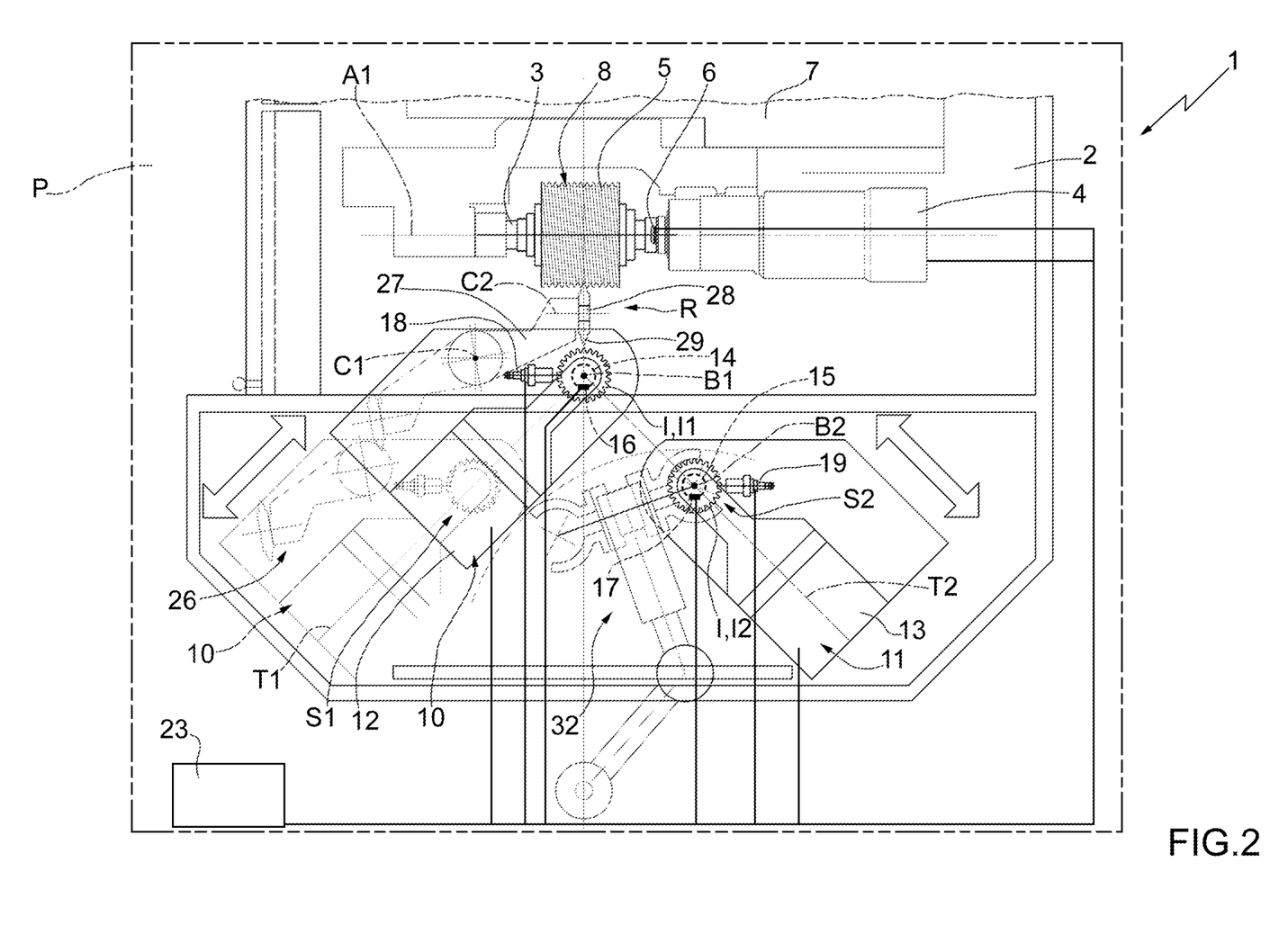

Numeral 1 in FIGS. 1 and 2 indicate a machine for the finishing of gears as a whole, comprising a base 2 suited to be rested on a horizontal plane P and having a working station L, a loading-unloading station S1 and a loading-unloading station S2. Machine 1 is a machine of the vertical axis type.

Machine 1 comprises a worktool carrier spindle 3, which is mounted so as to rotate around an axis A1, a motor 4 for putting the worktool carrier spindle 3 into rotation, and a finishing tool 5. As shown, the finishing tool is a grinding wheel 5 and machine 1 is suited to carry out a grinding operation. According to an embodiment not shown, the finishing tool 5 is a hob.

The grinding wheel 5 is fitted around the worktool carrier spindle 3 and is integral with the worktool carrier spindle 3 in the rotation around axis A1. The grinding wheel 5 is a screw grinding wheel and, in use, is suited to mesh with a gear I to be ground. The grinding wheel 5 has a grinding profile 8 for processing the gears I suited to obtain determined profiles of the finished gears I.

Machine 1 further comprises an angular position transducer 6 (of known type and shown diagrammatically) suited to instantly detect the angular position of the worktool carrier spindle 3 during its rotation around axis A1. For example, the angular position transducer 6 is an encoder.

Machine 1 comprises an activation system 7 (of known type and shown diagrammatically) on which the worktool carrier spindle 3 is mounted. The activation system 7 is suited to activate and position the grinding wheel 5 during the grinding and dressing processes. The activation system 7 translates the grinding wheel 5 from the working station L to a dressing station R and vice versa, as is explained better below.

As shown in the figures, machine 1 comprises two workpiece carrier slides 10 and 11 and two linear guide means 12 and 13, respectively. Each guide means 12, 13 comprises a linear guide (of known type and not illustrated) and a motor (of known type and not illustrated) which is suited to translate the corresponding workpiece carrier slide 10, 11 along said linear guide. The guide means 12 and 13 can be activated separately from each other.

The workpiece carrier slide 10 is mounted slidingly on the guide means 12 (of known type and shown diagrammatically) from the loading-unloading station S1 to the working station L, and vice versa. The workpiece carrier slide 11 is mounted slidingly on the guide means (of known type and shown diagrammatically) from the loading-unloading station S2 to the working station L, and vice versa.

Machine 1 comprises two workpiece carrier spindles 14 and 15, each of which is installed on a corresponding workpiece carrier slide 10 and 11, respectively. In particular, the workpiece carrier spindle 14 is mounted on the workpiece carrier slide 10 so as to rotate around a vertical axis B1. Similarly, the workpiece carrier spindle 15 is mounted on the workpiece carrier slide 11 so as to rotate around a vertical axis B2. Machine 1 comprises two activation devices (of known type and not illustrated), each of which is suited to rotate the workpiece carrier spindle 14 and the workpiece carrier spindle 15, respectively. For example, the devices for activating the workpiece carrier spindles 14 and 15 are electrical servomotors.

Additionally, machine 1 may comprise, when required to stiffen gear I being ground, two tailstocks (of known type and not illustrated), each of which is installed on a respective workpiece carrier slide 10, 11 at a respective workpiece carrier spindle 14, 15.

Machine 1 comprises a rotation sensor 16, which is suited to detect the angular position of the workpiece carrier spindle 14 during rotation around axis B1. Machine comprises a rotation sensor 17, which is suited to detect the angular position of the respective workpiece carrier spindle 15 during rotation around axis B2. The rotation sensors 16 and 17 are angular position transducers. In particular, the rotation sensors 16 and 17 are encoders.

Machine 1 further comprises a centering sensor 18 associated with the workpiece carrier spindle 14. Similarly, machine 1 further comprises a centering sensor 19 associated with the workpiece carrier spindle 15.

Once a gear I1, I2 is fitted and blocked on the workpiece carrier spindle 14, 15, the centering sensor 18, 19 is suited to detect the flanks of gear I1, I2 so as to determine the angular position of gear I1, I2 around the workpiece carrier spindle 14, 15.

As shown in FIGS. 1 and 2, each, centering sensor 18, 19 is mounted on the respective workpiece carrier slide 10, 11. In other words, the centering sensor 18, 19 is mounted on the workpiece carrier slide 10, 11 and is movable with it from the loading-unloading station S1, S2 to the working station L.

According to a variant (not illustrated), the centering sensor 18, 19 is installed in a fixed manner at the loading-unloading station S1, S2.

Machine 1 comprises a control unit 23 connected in known manner and shown diagrammatically, with the angular position transducer 6, the activation system 7, each guide means 12 and 13, the rotation sensors 16 and 17, and the centering sensors 18 and 19.

The control unit 23 is suited to synchronize each gear I1, I2 with the grinding wheel 5 outside of the working station or during the stroke of the loading-unloading station S1, S2 to the working station L, so that by entering the working station L gear I1, I2 meshes with the grinding wheel 5 without collisions and automatically. In other words, the control unit 23 is suited to synchronize each gear I1, I2 with the finishing tool 5 so as to mesh them with each other during the stroke thereof.

Machine 1 further comprises a profiling system 26 for the grinding wheel 5 comprising an arm 27 mounted on the workpiece carrier slide 10. Arm 27 is mounted pivoting, at a first end, around an axis C1 that is perpendicular to the resting plane P, from a resting position (shown in FIG. 1) to a working position (shown in FIG. 2) and vice versa.

Furthermore, the profiling system 26 comprises profiling spindle 28, which is mounted so as to rotate around an axis C2 transverse to axis C1, and a profiling roll 29, which is fitted on said profiling spindle 28. Finally, the profiling system 26 comprises means for activating arm 27 (of known type and not illustrated).

As shown in FIG. 2, when arm 27 is in the working position, the profiling roll 29 is arranged at the dressing station R in contact with the grinding wheel 5. The profiling roll 29 is suited to dress the grinding profile 8, so as to use the grinding wheel 5 again for a further processing cycle.

Machine 1 further comprises a robotic arm 32 (of known type and shown diagrammatically), which is suited to load-unload the gears I at the loading-unloading stations S1 and S2. The robotic arm 32 is suited to exchange the gears I from a platform external to machine 1 and vice versa.

It is worth noting that the guide means 12 is suited to translate the workpiece carrier slide 10 so that axis B1 of the workpiece carrier spindle 14 slides along a linear path T1. Similarly, the guide means 13 is suited to translate the workpiece carrier slide 11 so that axis B2 of the workpiece carrier spindle 15 slides along a linear path T2.

As shown in FIGS. 1 and 2, the paths T1 and T2 are incident at the working station L.

According to a variant (not illustrated), the finishing machine has three or more loading-unloading stations, in which the paths of the workpiece carrier slides are incident with one another. For example, the loading-unloading stations are arranged in a star around the working station.

Figure 3:
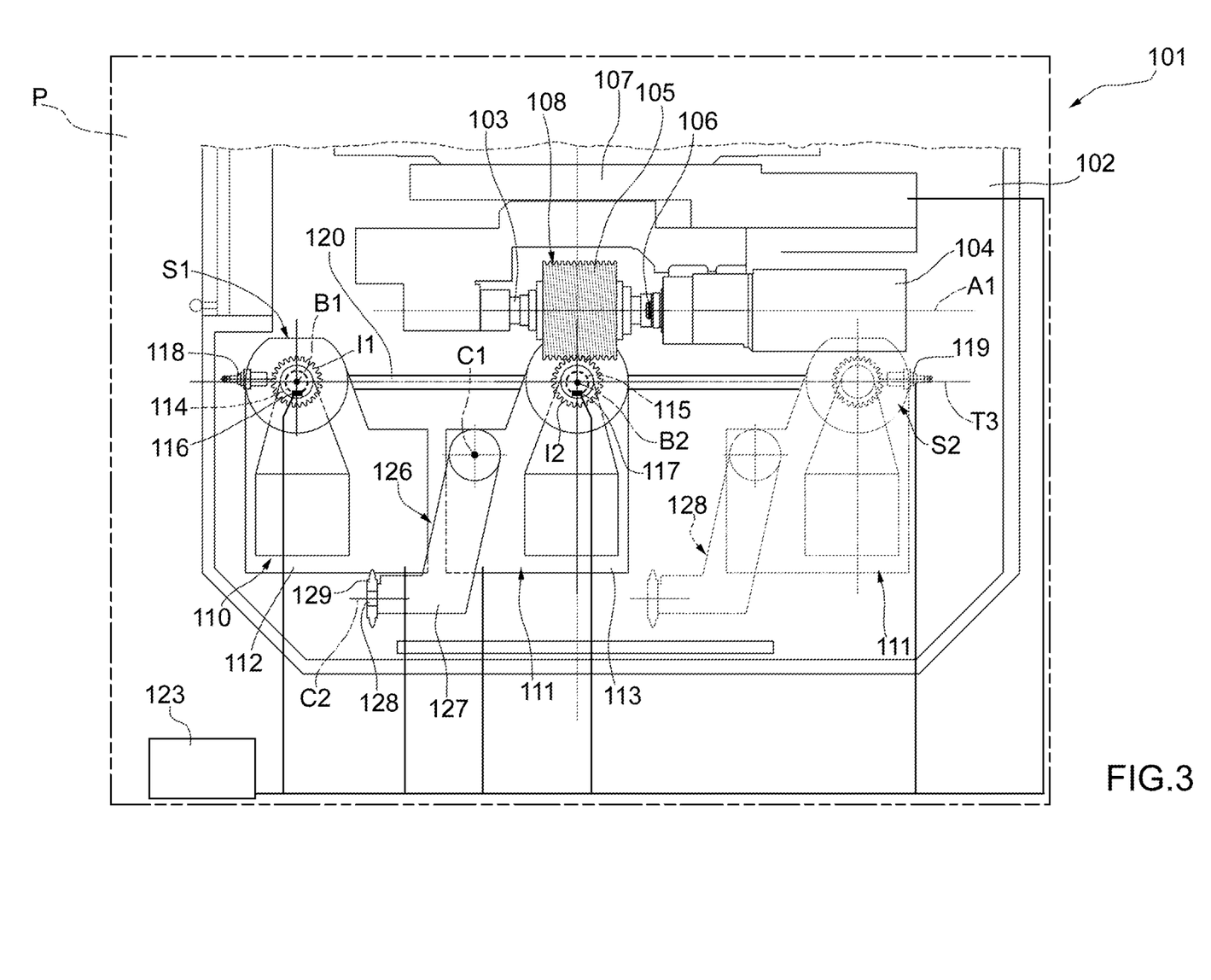
FIGS. 3 and 4 show a diagram, in plan view and with parts removed for clarity, of a first variant of the finishing machine according to the present invention, in a first and in a second operating configuration, respectively; and, FIGS. 5 and 6 show a diagram, in plan view and with parts removed for clarity, of a second variant of the finishing machine according to the present invention, in a first and second operating configuration, respectively.
Figure 4:
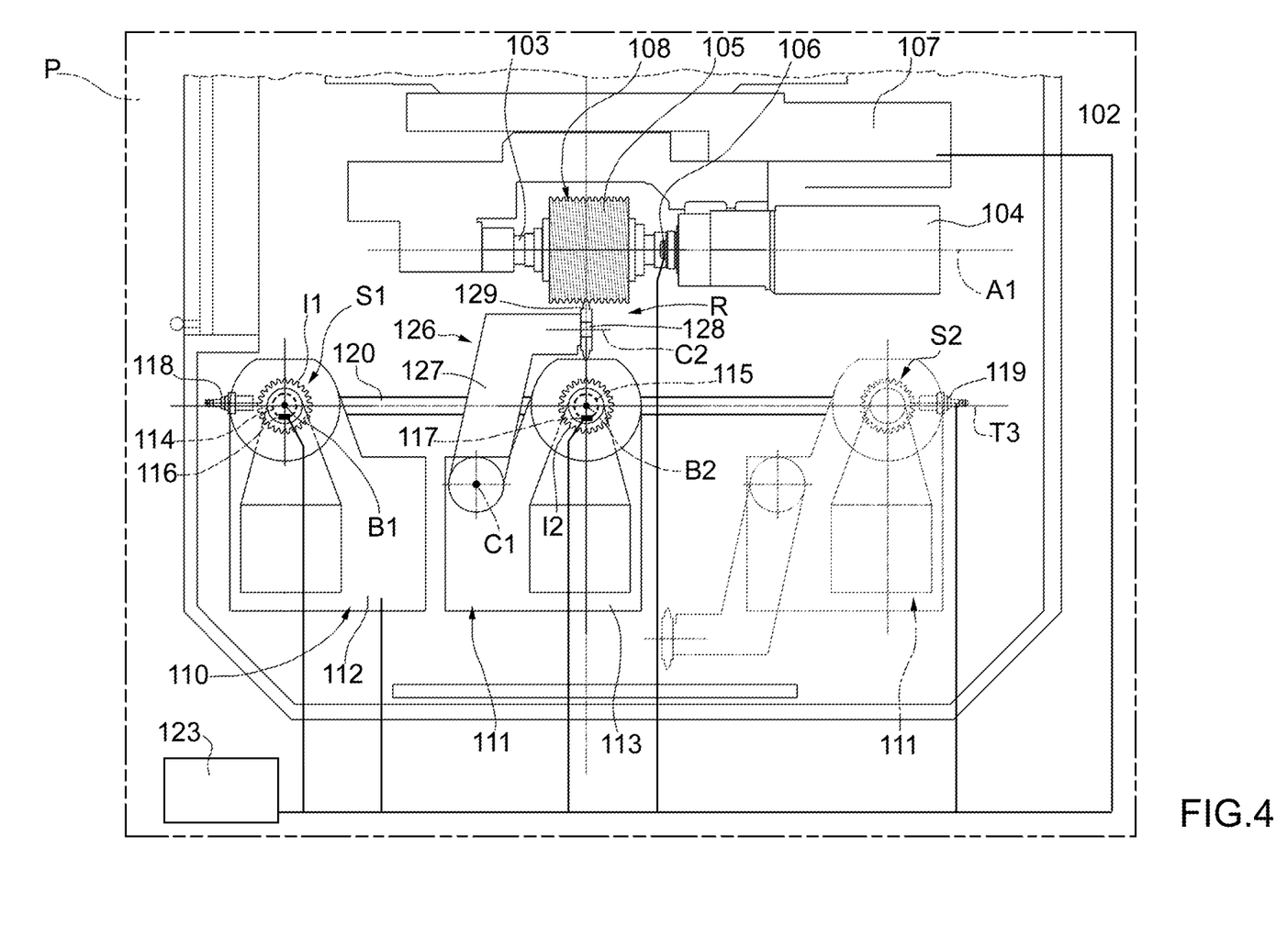

FIGS. 3 and 4 show a variant 101 of machine 1 shown in FIGS. 1 and 2; note that the same numerals in the order of one hundred are kept in FIGS. 3 and 4 for the common components.

Machine 101 comprises a common guide 120 on which both the guide means 112 of the workpiece carrier slide 110 and the guide means 113 of the workpiece carrier slide 111 are slidingly mounted. Guide 120 is rectilinear and extends along a path T3 parallel to axis A1 of spindle 103.

The loading-unloading stations are arranged in machine 101 at the ends of guide 120.

FIG. 4 shows the profiling roll 129 while it meshes with the grinding wheel 105 at the dressing station R.

As shown in FIGS. 3 and 4, each centering sensor 118, 119 is installed in a fixed manner at the respective loading-unloading station S1, S2. According to a variant not illustrated, each centering sensor is mounted on the respective workpiece carrier slide and is movable with it from the loading-unloading station S1, S2 to the working station L and vice versa.

Figure 5:
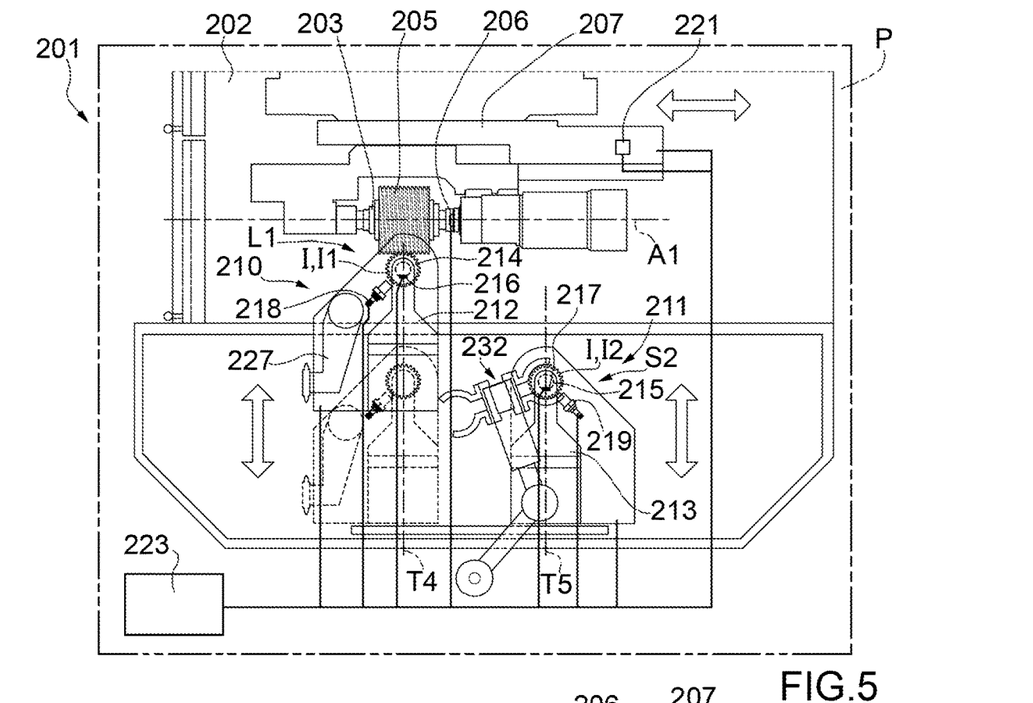
Figure 6:
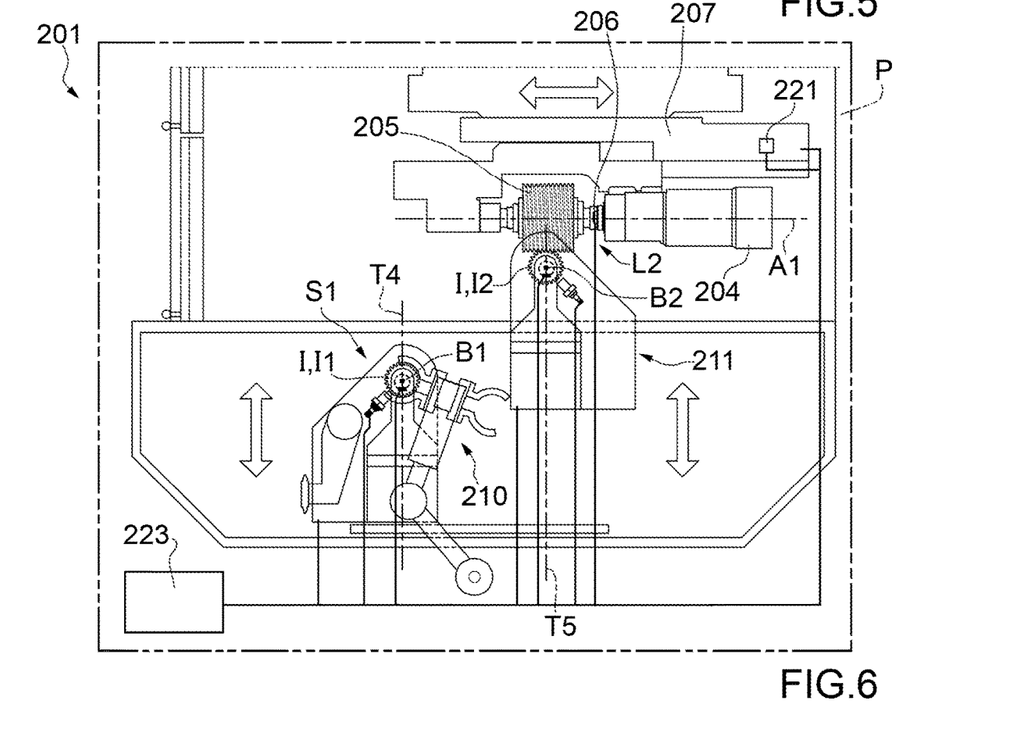

FIGS. 5 and 6 show a variant 201 of machine 1 shown in FIGS. 1 and 2; note that the same numerals in the order of two hundred are kept in FIGS. 5 and 6 for the common components. Machine 201 comprises two guide means 212 and 213 which are suited to translate the workpiece carrier slide 210 and 211, respectively, along two paths T4 and T5, respectively, which are rectilinear and parallel. Each guide means 212, 213 comprises a linear guide (of known type and not illustrated) and a motor (of known type and not illustrated) which is suited to translate the corresponding workpiece carrier slide 210, 211 along said guide. Furthermore, machine 201 has two working stations L1 and L2 and the finishing tool 205, in particular a grinding wheel. The activation system 207 is suited to translate the finishing tool 205 selectively between the working stations L1 and L2. The activation system 207 comprises, in turn, a position sensor 221 which is connected with the control unit 223 (in known manner and shown diagrammatically) and is suited to detect the position of the finishing tool 205 along one or more axes of machine 201. In particular, the position sensor 221 is suited to detect the position of the finishing tool 205 along axis A1. In addition to being connected (in similar manner to what is described above for the control unit 23 of machine 1) to the sensors 206, 216, 217, 218, 219, the control unit 223 is also connected to the position sensor 223.

According to a variant not illustrated, machine 201 may comprise a higher number of workpiece carrier slides with a consequent higher number of working stations between which the finishing tool 205 may be translated.

Below is a description of machine 1 illustrated in FIGS. 1 and 2 during the finishing process. In use, when the finishing process is activated, each workpiece carrier slide 10, 11 is arranged at the respective loading-unloading station S1, S2.

The grinding wheel 5 is put into rotation around its longitudinal axis A1.

A gear I1 is fitted and fixed on the workpiece carrier spindle 14.

The centering sensor 18 detects the angular position of gear I1 with respect to the workpiece carrier spindle 14. In particular, gear I1 is fitted on the workpiece carrier spindle 14 by means of the robotic arm 32.

Then, the workpiece carrier slide 14 carries out a delivery stroke and is translated from the loading-unloading station S1 to the working station L by means of the guide means 12. During the delivery stroke, gear I1 is rotated by means of the workpiece carrier spindle 14.

During the delivery stroke, the control unit 23 adjusts the rotation of the grinding wheel 5 and of gear I1 on the basis of the data exchanged with: the angular position transducer 6, the activation system 7, the guide means 12, the rotation sensor 16 and the centering sensor 18. In particular, the control unit 23 synchronizes the rotation of the grinding wheel 5 with the rotation of gear I1 so that as soon as gear I1 enters the working station L, it meshes with the grinding wheel 5 without collisions. In other words, the control unit 23 is suited to synchronize gear I1 and the grinding tool 5 so as to mesh them with each other during the stroke thereof.

Therefore, gear I1 is ground by the grinding wheel 5 (in known manner and not illustrated).

Once the operation of grinding gear I1 has ended, the workpiece carrier slide 10 carries out a return stroke and is translated by the guide means 12 from the working station L to the loading-unloading station S1. In other words, gear I1 is disengaged from the finishing tool 5.

During the delivery stroke and/or grinding step and/or return stroke of gear I1, a gear I2 is fitted and fixed on the workpiece carrier spindle 15. In particular, gear I2 is fitted on the workpiece carrier spindle 15 by means of the robotic arm 32.

The centering sensor 19 detects the angular position of gear I2 on the workpiece carrier spindle 15. Then, the workpiece carrier slide 15 carries out a delivery stroke and is translated by means of the guide means 13 from the loading-unloading station S2 to the working station L.

Due to the architecture described, the movements of the workpiece carrier slides 10 and 11 may be carried out simultaneously, in particular slide 11 goes from the loading station S2 to the working station L while slide 10 goes from the working station L to the loading station S1.

During this translation, gear I2 is rotated by means of the workpiece carrier spindle 15. The control unit 23 adjusts the rotation of the grinding wheel 5 and of gear I2 on the basis of the data exchanged with: the angular position transducer 6, the activation system 7, the guide means 13, the rotation sensor 17 and the centering sensor 19. In particular, the control unit 23 synchronizes the rotation of the grinding wheel 5 with the rotation of gear 12 so that as soon as gear I2 enters the working station L, it meshes with the grinding wheel 5 without collisions. In other words, the control unit 23 is suited to synchronize the finishing tool 5 and gear I2 so as to mesh them with each other during the stroke thereof.

The grinding wheel 5 remains at the working station L when gear I1 is changed with gear I2. In other words, the grinding wheel 5 remains at the working station L during the replacement of the gears I to be ground.

Preferably, gear I2 is introduced into the working station L as soon as gear I1 is moved away from the grinding wheel 5 at the end of grinding.

Then, gear I2 is ground by the grinding wheel 5.

Once the operation of grinding gear I2 has ended, the workpiece carrier slide 15 carries out a return stroke and is translated from the working station L to the loading-unloading station S2. In other words, gear I2 is disengaged from the finishing tool 5.

The steps described above are repeated cyclically. Thus, during the delivery stroke and/or grinding step and/or return, stroke of gear I2, a further gear (not illustrated) is fitted on the workpiece carrier spindle 14 and all the steps described above (not indicated or the purpose of brevity) for gear I1 are carried out again. As a rule, the steps described above are repeated until the grinding profile of the grinding wheel 5 is again capable of ensuring the roper grinding of the gears I.

When the grinding wheel 5 has a grinding profile which is no longer suitable for the proper processing of the gears I, the workpiece carrier slide 10 is arranged at the working station L while the grinding wheel 5 is arranged in the dressing station R by means of the activation system 7. Arm 27 of the profiling system 26 is arranged in the working position so that the profiling roll 29 is in contact with the grinding profile 8 of the grinding wheel 5. A profiling operation is thus carried out (of known type and not illustrated) to renew the grinding profile 8 of the grinding wheel 5 and allow the processing of further gears I again with the grinding wheel 5.

Once the profiling operation has ended, the grinding wheel 5 is brought back into the working station L and the grinding steps described above resume.

Machine 101 shown in FIGS. 3 and 4 carries out the same grinding steps as disclosed above, which are not indicated for the purpose of brevity. It is worth noting that the profiling system 126 on machine 101 is mounted on the workpiece carrier slide 110 but the profiling operations of the grinding wheel 105 remain substantially unchanged with respect to the ones described above, except for the arrangement of the workpiece carrier slide 110 at the working station L in place of the workpiece carrier slide 111.

As indicated above, during the delivery and return strokes, the gears I carry out linear paths and the grinding wheel 5, 105 remains positioned at the working station L during the step of changing the gears I. Thus, the interlocking times are significantly reduced since there is no longer a need to move the grinding wheel 5, 105 between one changing of gears I and the other.

As a rule, machine 201 shown, in FIGS. 5 and 6 carries out the same grinding steps as disclosed above, only since the paths T4 and T5 are parallel and have a plurality of working stations L1 and L2, the finishing tool 205 is translated, as required, from one working station L1 (L2) to the other working station L2 (L1). In particular, before and/or during the delivery stroke of workpiece carrier slide 210 (211) from the loading/unloading station S1 (S2) to the working station L1 (L2), the control unit 223 synchronizes the rotation and the translation of the finishing tool 205 with the rotation and the translation of gear I1 (I2) so that by entering the working station L1 (L2), gear I1 (I2) meshes with the finishing tool 205 without collisions. In other words, the control unit 223 synchronizes the translation and the rotation of the finishing tool 205 with the translation and the rotation of gear I1 (I2) so that they mesh with one another during the stroke at the working station L1 (L2). For the synchronization of the finishing tool 205 with gear I1 (I2), the control unit detects the data:

- of the angular position transducer 206 to determine the angular position of the finishing tool 205;
- of the position sensor 221 of the activation system 207 to determine the position of the finishing tool 205 with respect to one or more axes of machine 201;
- of the rotation sensors 216 and 217, each of which is installed at a respective workpiece carrier spindle 214 and 215; and
- of the centering sensors 218, 219, each of which is associated with a respective workpiece carrier slide (210 and 211 and is suited, in use, to detect the flanks of each gear I1, I2 fitted on a respective workpiece carrier spindle 214, 215, each gear I1, I2 being fixed, in use, in a determined angular position on the respective workpiece carrier spindle 214 and 215.

It is worth noting that FIG. 5 shows gear I1 while it meshes with the finishing tool 205 at the working station L1; while FIG. 6 shows gear I2 while it meshes with the finishing tool 205 at the working station L2.

The interpolation in machine 201 of the movements of the finishing tool 205 and of the workpiece carrier slides 210 and 211 replicates substantially the structure of machine 1. In other words, machine 1 and 201 have equivalent operations.

It follows from the above disclosure that by having two workpiece carrier slides 10, 11; 110, 111; 210, 211 activated separately, it is possible to operate on one workpiece carrier spindle 14; 114; 214 stopped in the loading-unloading station S1 while the other workpiece carrier spindle 15; 115; 215 carries out the delivery and/or return stroke. This is not possible in a finishing machine of known type in which there is one workpiece carrier table for all spindles, which consequently are activated at the same time.

Thus, the times are significantly reduced for supplying the gears from the loading-unloading station to the processing station.

Furthermore, the presence of a plurality of loading-unloading stations S1 and S2 allows the loading-unloading operations of the gears to be performed in masked time, thus significantly reducing the interlocking times.

Finally, the synchronization between each gear I and the grinding wheel 5, 105, 205 during the transfer from the loading-unloading station to the working station L, L1, L2 allows gear I and the grinding wheel 5, 105, 205 to be automatically meshed without collisions at the working station L, L1, L2. In other words, the synchronization between each gear I and the grinding wheel allows the grinding wheel 5, 105, 205 to be meshed during the stroke with each gear at the working station L, L1, L2. Thereby, the time currently required for the adjustment and meshing operations between the grinding wheel 5, 105, 205 and gear I at the working station L on the finishing machines of known type, is eliminated.

Therefore, it follows from the above disclosure that the machine and method for the finishing of gears of the type described above allows the interlocking times to be significantly reduced, with a subsequent saving on production costs.

The invention claimed is:

1. A machine capable of finishing gears comprising:
   a plurality of workpiece carrier slides;
   a plurality of workpiece carrier spindles, each workpiece carrier spindle of said plurality of workpiece carrier spindles being mounted on a respective workpiece carrier slide, each workpiece carrier spindle of said plurality of workpiece carrier spindles also being configured to support a gear and being mounted so as to rotate around a respective axis;
   a plurality of loading-unloading stations, each loading-unloading station of said plurality of loading-unloading stations being associated with one of said workpiece carrier slides;
   each workpiece carrier slide being configured and mounted so as to slide on a respective linear guide means from a respective loading-unloading station to one or more working stations and vice versa;
   a finishing tool being configured to mesh, in use, with a gear supported on a respective said workpiece carrier spindle to be finished; wherein the finishing tool is configured and mounted so as to rotate around a longitudinal axis;
   wherein the machine further comprises a control unit, which is configured so that it synchronizes rotation of each gear supported on a respective said workpiece carrier spindle with the rotation of the finishing tool, while each gear is outside of a said working station, so that when each gear enters a said working station each gear meshes with the finishing tool without collisions; and
   wherein each said respective linear guide means is configured such that it is capable of translating its said respective workpiece carrier slide independent of movements of said other workpiece carrier slides and so that the axis of its said respective workpiece carrier spindle is translated along a generally horizontal, linear path, to and from a said respective loading-unloading station and a said working station; said machine being further configured such that each said workpiece carrier slide carries a gear upon its said respective workpiece carrier spindle to the same finishing tool.

2. A machine according to claim 1, wherein the machine is configured such that the workpiece carrier slides are activated separately from each other by the respective guide means.

3. A machine according to claim 1, wherein the control unit comprises an angular position transducer to determine the angular position of the finishing tool, a plurality of rotation sensors, each of which is installed at a respective workpiece carrier spindle, and a plurality of centering sensors, each of which is associated with a respective workpiece carrier slide and is configured to detect the flanks of each gear fitted on a respective workpiece carrier spindle; each gear being fixed, in use, in a determined angular position on the workpiece carrier spindle.

4. A machine according to claim 3, wherein each centering sensor is installed in a fixed manner at the respective loading-unloading station.

5. A machine according to claim 3, wherein each centering sensor is mounted on a respective workpiece carrier slide and is movable with it.

6. A machine according to claim 1, wherein the workpiece carrier slides are configured to slide along paths that are incident with one another at the working station.

7. A machine according to claim 1, wherein the workpiece carrier slides are configured to slide along a common path, the loading-unloading stations being arranged at the ends of said common path.

8. A machine according to claim 1, wherein the workpiece carrier slides are configured to slide along paths which are parallel to each other; wherein said machine includes two or more working stations for associating with respective workpiece carrier slides, and wherein the finishing tool is movable between said two or more working stations.

9. A machine according to claim 8, wherein the control unit comprises a position sensor which is configured to detect the position of the finishing tool along one or more axes of the machine.

10. A machine according to claim 1 further comprising a profiling system for the finishing tool, which comprises, in turn, a profiling roll; the profiling system of the finishing tool being installed on one of the workpiece carrier slides.

11. A machine according to claim 1 further comprising a robotic arm configured to load/unload the gears at each loading-unloading station.

12. A method for finishing gears in a machine, the machine comprising a plurality of workpiece carrier slides and a finishing tool rotating about its longitudinal axis; the machine also having one or more working stations and a plurality of loading-unloading stations; the method comprising the steps of:
fitting a first gear onto a first workpiece carrier spindle, which is mounted so as to rotate on a first workpiece carrier slide at a first loading-unloading station of said plurality of loading-unloading stations;
translating a first workpiece carrier slide of said plurality of workpiece carrier slides from the first loading-unloading station to a first working station of said one or more working stations, so as to perform a delivery stroke and rotating the first workpiece carrier spindle during the delivery stroke;
synchronizing, with respect to each other, the rotation of the finishing tool, the rotation of the first workpiece carrier spindle, and the translation of the first workpiece carrier slide during the delivery stroke, so that when the first gear enters the first working station the first gear meshes with the finishing tool without collisions;
finishing the first gear at the first working station utilizing the finishing tool;
disengaging the first gear from the finishing tool; and
during the steps of fitting and/or translating and/or finishing and/or disengaging the first gear, carrying out the steps of fitting and/or translating and/or synchronizing with a second gear and a second workpiece carrier spindle, which is mounted so as to rotate on a second workpiece carrier slide so that when the second gear enters the first or a second working station of said one or more working stations, the second gear meshes with the finishing tool without collisions, after the first gear has been disengaged from the finishing tool; and
wherein each said workpiece carrier slide, carrying said first and said second gears, respectively, translates back and forth along a generally horizontal, linear path, independent of movement of said other workpiece carrier slides and to and from said respective loading-unloading station and a said respective working station.

13. A method according to claim 12, wherein the machine has a plurality of working stations and the finishing tool is movable so as to be selectively positioned at each working station; the method comprising the steps of:
detecting the position of the finishing tool by means of a position sensor;
translating the finishing tool towards one selected working station of the plurality of working stations selected before and/or during the delivery stroke of each workpiece carrier slide, if the finishing tool is in a different position with respect to said selected working station;
wherein the synchronizing step includes the step of synchronizing the rotation of the finishing tool, the rotation of the workpiece carrier spindle, the translation of the workpiece carrier slide, and the translation of the finishing tool, so that when the first or second gear enters the respective selected working station, the respective first or second gear and the finishing tool selectively mesh with each other without collisions.

14. A method according to claim 12, wherein the first and second gears are supplied and/or unloaded at each loading-unloading station by means of a robotic arm.

* * * * *